(12) United States Patent
Arndt et al.

(10) Patent No.: US 10,597,054 B2
(45) Date of Patent: Mar. 24, 2020

(54) REAL-TIME DRONE INFRARED INSPECTION OF MOVING TRAIN

(71) Applicant: Progress Rail Locomotive Inc., LaGrange, IL (US)

(72) Inventors: Donald J. Arndt, Napoleon, MO (US); Mark J. Bartonek, Independence, MO (US)

(73) Assignee: Progress Rail Locomotive Inc., LaGrange, IL (US)

( * ) Notice: Subject to any disclaimer, the term of this patent is extended or adjusted under 35 U.S.C. 154(b) by 88 days.

(21) Appl. No.: 15/380,472

(22) Filed: Dec. 15, 2016

(65) Prior Publication Data

US 2018/0170414 A1   Jun. 21, 2018

(51) Int. Cl.
  *B61L 25/02*    (2006.01)
  *B64C 39/02*    (2006.01)
  (Continued)

(52) U.S. Cl.
  CPC ......... *B61L 25/023* (2013.01); *B61L 15/0072* (2013.01); *B61L 15/0081* (2013.01);
  (Continued)

(58) Field of Classification Search
  CPC .... G06K 7/1413; G06K 7/14; G06K 7/10366; G06Q 10/08; G06Q 10/0832; G06Q 10/083; G06Q 50/28; G06Q 10/0833; B64C 39/024; B64C 39/02; B64C 13/20; B64C 33/025; B64C 39/08; B64C 39/028; B64C 39/00; B64C 2201/027; B64C 2201/108; B64C 2201/127; B64C 2201/208; G05D 1/00; G05D 1/0022; G05D 1/0088; G05D 1/101; G05D 1/0094; G05D 1/0684; G01S 19/49; G01S 5/0018; G01S 17/42; G01S 7/48; G01S 5/00; H04W 4/046; H04W 24/02; B64F 1/222; B64F 1/007; B64F 1/00; B64F 1/31; G08G 5/025; G08G 5/045; G08G 5/04; B64D 47/08; B64D 45/00; B64D 1/22; H04N 5/23248; H04N 5/232; H04N 5/225; G06T 7/004; G06T 7/00; G06T 5/50; G06T 7/70; B60L 15/00;
  (Continued)

(56) References Cited

U.S. PATENT DOCUMENTS 3,272,550 A   9/1966 Peterson
8,790,081 B1  7/2014 Burger et al.
(Continued)

FOREIGN PATENT DOCUMENTS

WO   WO-2013/086578 A1   6/2013

*Primary Examiner* — Behrang Badii
(74) *Attorney, Agent, or Firm* — Miller, Mathias & Hull (57) ABSTRACT

A system and method for inspecting components of a moving train having a locomotive and a plurality of rail cars is disclosed. An inspection unmanned aerial vehicle (UAV) may be deployed from the locomotive or one of the rail cars of the train, and the inspection UAV may fly to an initial inspection position relative to the moving train. The inspection UAV performs an inspection function on components of the moving train via inspection equipment mounted on the inspection UAV and starting at the initial inspection position. The inspection UAV then returns to the locomotive and the rail car after the inspection of the components of the moving train is complete.

7 Claims, 6 Drawing Sheets

(51) Int. Cl.
*B64D 47/08* (2006.01)
*B61L 15/00* (2006.01)
*B61L 23/04* (2006.01)
*B61L 27/00* (2006.01)
*G06Q 10/08* (2012.01)
*G06K 7/14* (2006.01)
*G05D 1/00* (2006.01)
*G06T 7/70* (2017.01)
*G01S 19/49* (2010.01)

(52) U.S. Cl.
CPC ......... *B61L 23/041* (2013.01); *B61L 27/0094* (2013.01); *B64C 39/024* (2013.01); *B64D 47/08* (2013.01); *B64C 39/02* (2013.01); *B64C 2201/027* (2013.01); *B64C 2201/108* (2013.01); *B64C 2201/127* (2013.01); *B64C 2201/208* (2013.01); *G01S 19/49* (2013.01); *G05D 1/00* (2013.01); *G06K 7/14* (2013.01); *G06Q 10/08* (2013.01); *G06Q 10/0833* (2013.01); *G06T 7/70* (2017.01)

(58) Field of Classification Search
CPC .......... B60L 53/14; B60L 15/32; B60L 15/34; B60L 15/38; B60L 53/30; B60L 5/39; G01C 3/08; B61B 3/02; B61B 1/02; B61B 13/00; B61L 15/0072; B61L 15/0081; B61L 23/041; B61L 27/0094; B61L 25/023; B60T 13/66; G06F 3/048; E01B 25/22; G01P 13/0066; G01P 13/02; G01P 5/14; G01P 13/025; H04B 7/18506; H04B 7/18504; B62D 47/006; B62D 31/003; B62D 31/025; E04H 14/00; B60P 3/007
See application file for complete search history.

(56) References Cited

U.S. PATENT DOCUMENTS

| | | | |
|---|---|---|---|
| 9,739,870 B1* | 8/2017 | Beckman | B64C 39/024 |
| 2015/0009331 A1 | 1/2015 | Venkatraman | |
| 2015/0225002 A1 | 8/2015 | Branka et al. | |
| 2016/0159381 A1 | 6/2016 | Fahmy | |
| 2016/0297454 A1 | 10/2016 | Shubs, Jr. et al. | |
| 2017/0175413 A1* | 6/2017 | Curlander | E04H 14/00 |
| 2017/0188222 A1* | 6/2017 | Cooper | H04H 60/25 |
| 2017/0329307 A1* | 11/2017 | Castillo-Effen | F01D 5/005 |
| 2018/0089622 A1* | 3/2018 | Burch, V | G06Q 10/0833 |
| 2018/0101173 A1* | 4/2018 | Banerjee | G06T 7/70 |
| 2018/0265098 A1* | 9/2018 | Evans | B61B 3/02 |
| 2018/0320402 A1* | 11/2018 | Evans | B60L 53/14 |

* cited by examiner

REAL-TIME DRONE INFRARED INSPECTION OF MOVING TRAIN

TECHNICAL FIELD

The present disclosure relates generally to rail transportation and, more particularly, to inspection of train engines and cars and determining high temperatures and other potentially hazardous conditions for train undercarriage components while the train in moving.

BACKGROUND

Safe and reliable operation of a railroad system may be dependent upon the integrity of the rolling mechanisms of the vehicles travelling over the rails. Worn or damaged train wheel bearings may increase the rolling friction of the axle thereby increasing the power required to pull the train. In addition, worn, damaged or defective bearings may cause excessive wear to the train axle and, in the case of failure of the bearing, may even cause the axle to lock up, preventing rotation of the wheel and thus resulting in a potential fire hazard due to the heat buildup and potential sparking caused by friction of the locked wheel scraping along the rail. A locked up bearing will eventually burn off and possibly cause a derailment of the train.

Bearing temperatures may be determined by sensing a temperature of the wheel bearing indirectly through a bearing box surrounding the wheel bearing on a rail car of a train. In current railway systems, train inspection stations may be installed adjacent to the tracks approximately every 15-25 miles along the train line. Infrared radiation (IR) thermal imaging sensors are mounted at the train inspection stations, defect detector stations and/or hot bearing detector stations. The sensors are aimed toward the tracks to detect IR energy emitted by the wheel bearings and the wheels of passing rail cars. The IR energy may be indicative of the temperatures of the wheel bearings and the wheels. If the IR energy indicates that the temperatures of the bearings or the wheels is above a threshold where the safety and performance of the train undercarriage components may be compromised, the train inspection station may transmit warning messages to the train or to a back office responsible for the trains and/or the train line to provide an alert of the potentially hazardous situation.

SUMMARY OF THE DISCLOSURE

In one aspect of the present disclosure, a method for inspecting components of a moving train having a locomotive and a plurality of rail cars is disclosed. The method may include deploying an inspection unmanned aerial vehicle (UAV) from one of the locomotive and one of the plurality of rail cars, flying the inspection UAV to an initial inspection position relative to the moving train, and performing an inspection function on components of the moving train via inspection equipment mounted on the inspection UAV and starting at the initial inspection position. The method may further include returning the inspection UAV to the one of the locomotive and the one of the plurality of rail cars after performance of the inspection function on the components of the moving train is complete.

In another aspect of the present disclosure, a system for inspecting components of a moving train having a locomotive and a plurality of rail cars is disclosed. The system may include an inspection UAV including a plurality of propellers, a plurality of propeller drive motors, wherein each of the plurality of propeller drive motors rotates a corresponding one of the plurality of propellers, inspection equipment for performing an inspection function of the components of the moving train, and a UAV controller operatively connected to the plurality of propeller drive motors and the inspection equipment. The system may further include a locomotive controller at the locomotive of the moving train. The locomotive controller is configured to generate and transmit first flight control signals to the UAV controller to cause the UAV controller to actuate the plurality of propeller drive motors to fly the inspection UAV from the moving train to an initial inspection position relative to the moving train, to generate and transmit second flight control signals to the UAV controller to cause the UAV controller to actuate the plurality of propeller drive motors to cause the inspection UAV to hover at the initial inspection position, and to generate and transmit inspection control signals to the UAV controller to cause the UAV controller to actuate the inspection equipment to performing the inspection function on the components of the moving train as the moving train moves past the initial inspection position.

In a further aspect of the present disclosure, a method for inspecting components of a moving train having a locomotive and a plurality of rail cars is disclosed. The method may include flying an inspection UAV from the moving train to an initial inspection position at a front of the locomotive on a first side of the moving train, causing the inspection UAV to hover at the initial inspection position, and performing an inspection function on components on the first side of the moving train via inspection equipment mounted on the inspection UAV as the moving train moves past the inspection UAV at the initial inspection position.

Additional aspects are defined by the claims of this patent.

DETAILED DESCRIPTION

Figure 1:
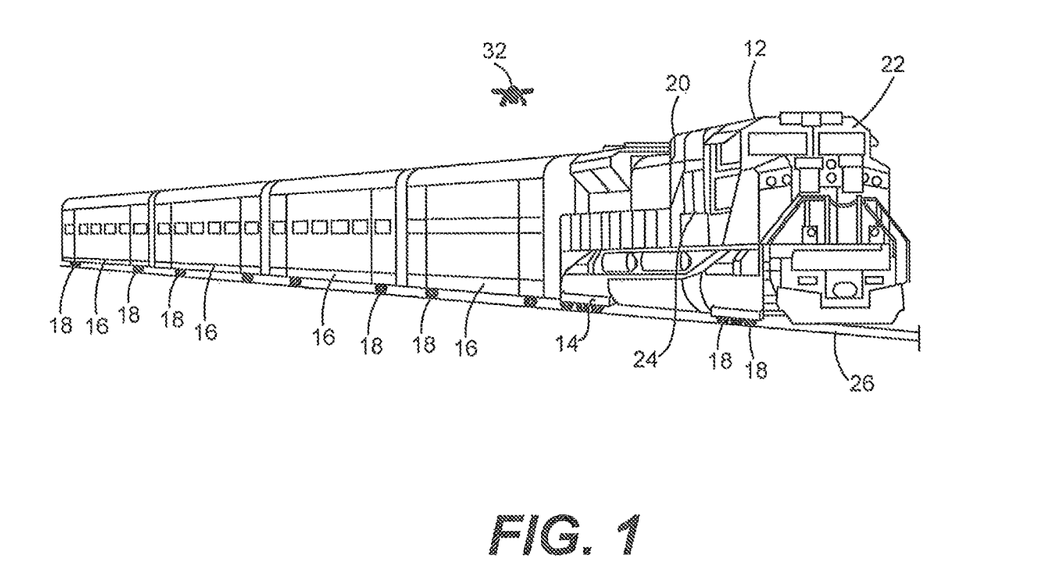
FIG. 1 is a perspective view of a train having a locomotive, multiple rail cars and an inspection UAV in accordance with the present disclosure.

Referring to FIG. 1, an exemplary train 10 is illustrated. The train 10 includes a locomotive 12, a chassis 14, and a number of rail cars 16. The locomotive 12 and the rail cars 16 each have a plurality of wheels 18. The locomotive 12 may further include a body 20, an operator's cab 22, and a walking platform 24. It should be noted that the train 10 may include more than one locomotive 12 as well, without departing from the scope of the disclosure. The train 10 may further include various other components such as, but not limited to, a number of doors and windows. For the purpose of simplicity, the various other components of the train 10 are not labeled in FIG. 1, but other components and features of the locomotive 12 and the rail cars 16 necessary for a complete understanding of moving train inspection in accordance with the present disclosure are illustrated in the drawings figures and describe hereinafter.

Figure 2:
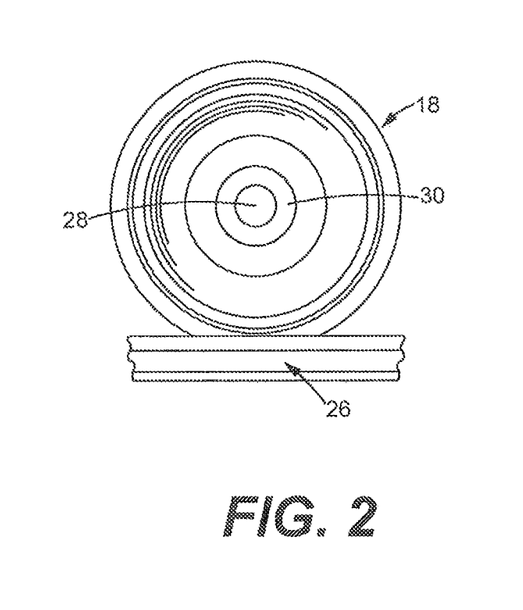
FIG. 2 is a side view of an exemplary wheel of the locomotive or rail cars of the train of FIG. 1.

The rail cars 16 are coupled to the locomotive 12 at the first rail car 16, and to each other in succession behind the first rail car 16. The train 10 runs along a train line on train tracks 26 that guide the wheels 18. FIG. 2 illustrates an exemplary wheel 18 that may be installed on the locomotive 12 and the rail cars 16. Each wheel 18 is mounted on one end of a corresponding axle 28 by a bearing 30 that allows the wheel 18 to freely rotate on the end of the axle 28. However, over time, friction in the bearings 30 causes the wheels 18 and the bearings 30 to heat up. Defects in the bearing components will also cause the bearing to heat up to a critical point where the bearing may melt and cause a derailment of the train 10.

Returning for FIG. 1, the temperature of the wheels 18 and the bearings 30 may be monitored periodically while the train 10 is moving over the train tracks 26 by an inspection unmanned aerial vehicle (UAV) 32, or inspection drone, that is associated with the train 10. In general terms, the inspection UAV 32 may ride along on the locomotive 12 or one of the rail cars 16 until it is determined that the inspection UAV 32 should be deployed to inspect the wheels 18 and the bearings 30 for hazardous temperature conditions, and to inspect the wheels 18 or other components of the train 10 for other operational conditions that may affect the performance or safety of the train 10 while in transit. While the examples illustrated and described herein have focus on the inspection of the wheels 18 and accompanying bearings 30, those skilled in the art will understand that the inspection strategy set forth herein may be applied the inspection of any other appropriate components of the train 10, such as brakes, undercarriage frames, shock absorbing components, external surfaces and the like. The deployment of the inspection UAV 32 may be triggered by any appropriate trigger event, such as after a predetermined number of miles or period of time that the train 10 travels, the occurrence of an abnormal operating condition of the train 10, or the like. Once deployed, the inspection UAV 32 may be automatically controlled by a control system on board the train 10 or by a remote control system, or manually by an engineer or operator of the train 10 or other technician to position the inspection UAV 32 at appropriate locations relative to the locomotive 12 and the rail cars 16 to perform its inspection functions.

Figure 3:
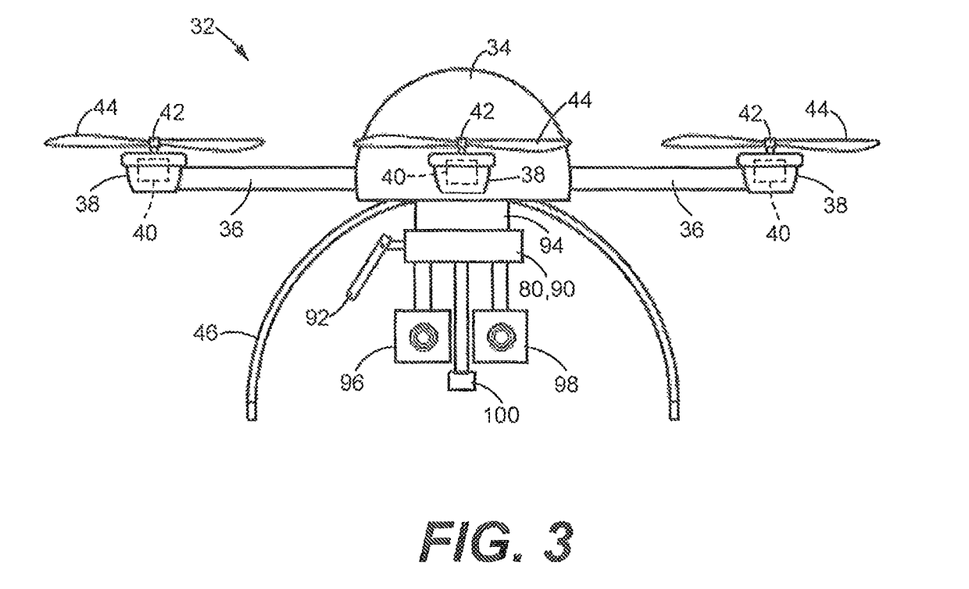
FIG. 3 is a side view of an embodiment of the inspection UAV in accordance with the present disclosure of FIG. 1.

In one exemplary embodiment illustrated in FIG. 3, the inspection UAV 32 may be a quadcopter drone of the type commonly known in the art. The inspection UAV 32 may have a vehicle housing 34 and four motor support arms 36 extending from and circumferentially spaced about the vehicle housing 34. Each motor support arm 36 has corresponding motor housing 38 attached at an end opposite the vehicle housing 34 and enclosing a propeller drive motor 40. Propeller shafts 42 extend from the propeller drive motors 40 and have corresponding propellers 44 attached to ends opposite the propeller drive motors 40 so that the propeller drive motors 40 rotate the propellers 44 to create lift and control the flight of the inspection UAV 32 in the manner known in the art. The inspection UAV 32 as illustrated includes a support structure 46 mounted to the vehicle housing 34 and extending downwardly to support the inspection UAV 32 when it is not in flight and is resting on a surface.

The vehicle housing 34 may enclose the electrical and power elements that control the flight of the inspection UAV 32 in response to flight control signals from a flight controller associated with the inspection UAV 32. Referring to the block diagram of FIG. 4, the illustrated embodiment of the inspection UAV 32 may include a UAV controller 50 that may be capable of processing flight control signals received from a flight controller (not shown) using software stored at the UAV controller 50, and outputting command and control signals to the propeller drive motors 40 to control the flight of the inspection UAV 32. The UAV controller 50 may include a processor 52 for executing a flight control routine that controls the propeller drive motors 40. The processor 52 may be operatively connected to a memory 54 that may have a read only memory (ROM) 56 for storing programs, and a random access memory (RAM) 58 serving as a working memory area for use in executing a flight control program stored in the ROM 56. Although the processor 52 is shown, it is also possible and contemplated to use other electronic components such as a microcontroller, an application specific integrated circuit (ASIC) chip, or any other integrated circuit device. A UAV communication module 60 may be operatively connected to the UAV controller 50 and capable of wireless communications with the flight controller to receive the flight control signals and communicate the flight control signals to the UAV controller 50.

Figure 4:
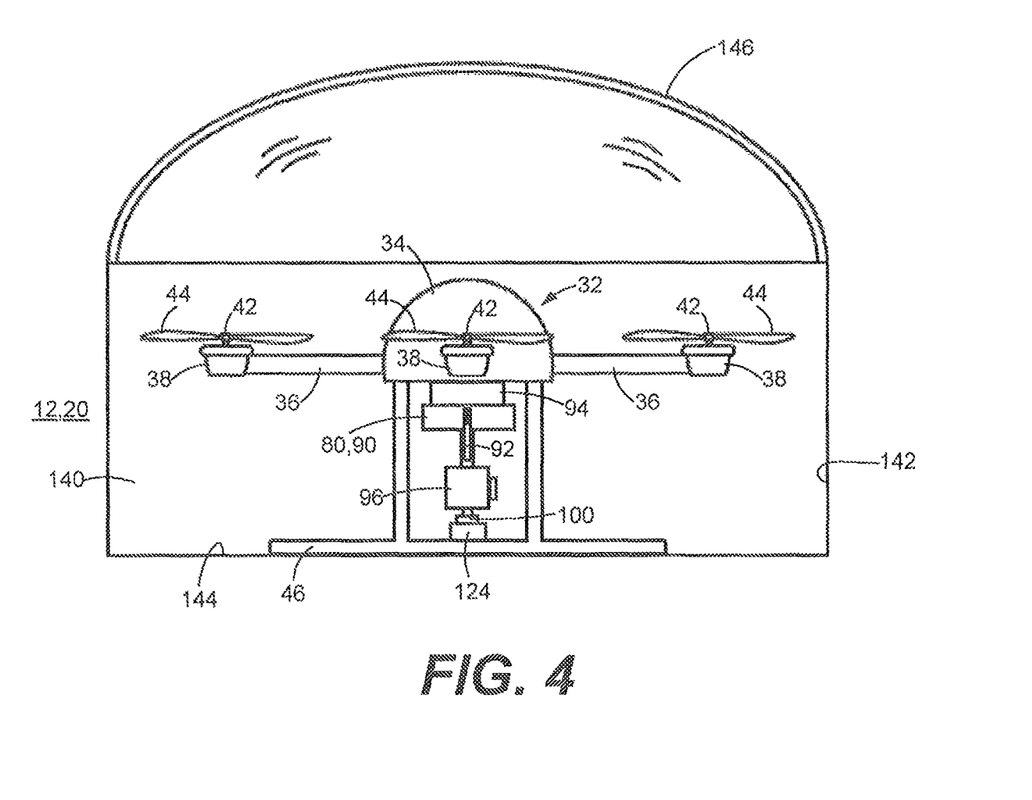
FIG. 4 is a block diagram of electrical and power elements that may control the flight of the inspection UAV of FIG. 3.

The vehicle housing 34 may also house a UAV power source 62 providing power to the UAV controller 50, the UAV communication module 60 and the propeller drive motors 40. The UAV controller 50 and the UAV power source 62 may be operatively connected to the propeller drive motors 40 by wiring that runs through the motor support arms 36. When the flight control signals are received, the UAV controller 50 causes the UAV power source 62 to be electrically connected to the propeller drive motors 40 to cause the propeller drive motors 40 to rotate the corresponding propellers 44 at speeds that will cause the inspection UAV 32 to fly as commanded by the flight controller. The illustrated embodiment of the quadcopter drone of FIG. 3 and the associated electrical components of FIG. 4 is exemplary only. Those skilled in the art will understand that other types of UAVs that can be deployed from the train 10 and perform flight maneuvers as described herein to inspect the train 10 may also be implemented with the train inspection strategy in accordance with the present disclosure.

Depending on the particular implementation of the inspection strategy in accordance with the present disclosure, the inspection UAV 32 may be equipped with additional flight control and navigation devices. For example, the inspection UAV 32 may include a global positioning system (GPS) receiver 64 that receives GPS signals from the GPS satellites, calculates the position of the inspection UAV 32 from the GPS signals, and transmits the position to the UAV controller 50. An altimeter 66 may be provided to detect an altitude of the inspection UAV 32 as the inspection UAV 32 is performing inspection operations, and to communicate the altitude to the UAV controller 50 as feedback to ensure the inspection UAV 32 is flying at a necessary vertical position relative to the components of the train 10 being inspected, such as the wheels 18 and bearings 30. For similar positioning considerations, a distance sensor 68, such as an IR or ultrasonic proximity sensor, may be provided to detect a horizontal distance from the inspection UAV 32 to the inspected components so that the UAV controller 50 can cause the inspection UAV 32 to move closer to or away from the inspected components. Additional distance sensors (not shown) may be provided to detect distances to other objects around the inspection UAV 32, such as the distance to the ground beneath the inspection UAV 32. A homing signal generator 70 may transmit a homing signal to the UAV controller 50 or directly to the UAV communication module 60 to output a homing signal that may be used by the control components of the locomotive 12 to guide the inspection UAV 32 back to the locomotive 12 after an inspection routine is complete. Implementation of additional types of navigation devices in the inspection UAV 32 as necessary for an inspection strategy is contemplated.

The inspection UAV 32 as illustrated in FIG. 3 is equipped with inspection equipment for performing various inspection operations and communicating with corresponding control equipment of the locomotive 12 and/or a back office responsible for the operation of the trains 10 and/or the train line. With reference to the embodiment of FIG. 3 and a block diagram of FIG. 5, the inspection functions of the inspection UAV 32 may be controlled by an inspection controller 80 that may be, for example, one of the types of control structures described above. Consequently, the inspection controller 80 may include a processor 82 operatively connected to a memory 84 that includes a ROM 86 and a RAM 88. The memory 84 may store inspection control routines that will be used by the inspection controller 80 to control the performance of the inspection operations when the inspection UAV 32 is deployed. The inspection equipment may have an inspection communication module 90 with an external wireless antenna 92 for inspection-specific communications with the locomotive 12 and/or the back office. The illustrated embodiment of the inspection UAV 32 may further include an auxiliary power source 94 that may provide power to the inspection equipment as a supplement to or as an alternative to power from the UAV power source 62.

Figure 5:
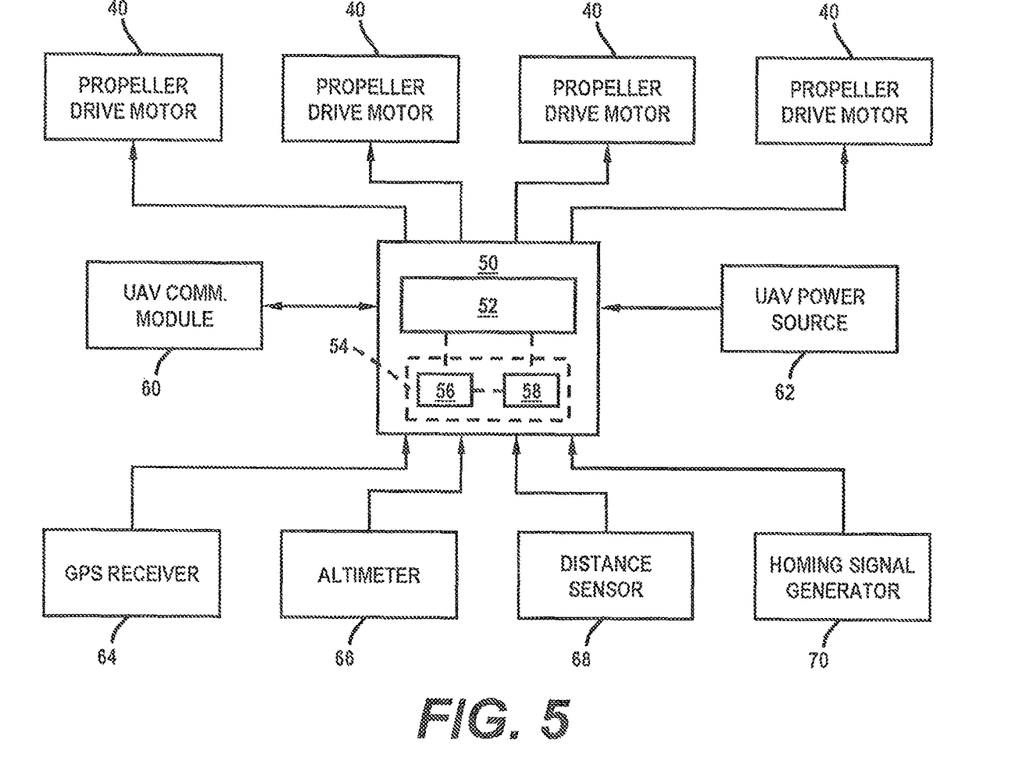
FIG. 5 is a block diagram of electrical and power elements for performing the inspection functions of the inspection UAV of FIG. 3.

The inspection controller 80 may control one or more inspection devices that will perform the inspections functions on the train 10. For example, an IR thermography or thermal imaging camera 96 may be provided to detect IR radiation from the wheels 18, the bearings 30 or other components that can heat over time as the train 10 travels along the rail line. The thermal imaging camera 96 may produce images of the IR radiation, or thermograms, that can be analyzed by the inspection controller 80 and/or transmitted to the locomotive 12 or back office for analysis. The inspection UAV 32 may also have a video camera 98 for capturing digital video images of the train 10 that may be transmitted and visually inspected by engineers or maintenance personnel to detect potential operational issues that may affect the operation of the train 10. Additional or alternative inspection equipment, such as ultrasonic and radiographic inspection devices, may be provide on the inspection UAV 32 depending on the inspection requirements for a particular implementation, and the integration of such inspection equipment into the inspection UAV 32 will be with the understanding of those skilled in the art.

The inspection equipment may further include a locomotive interface connector 100 that may be configured to connect to a corresponding interface connector on the locomotive 12 or rail car 16 where the inspection UAV 32 is stored when not in use. The locomotive interface connector 100 may serve multiple functions for the inspection UAV 32. For example, the locomotive interface connector 100 may include a power connection connecting the inspection UAV 32 to a power source (not shown) of the locomotive 12 to provide power to recharge the UAV power source 62 and the auxiliary power source 94. The locomotive interface connector 100 may also include a communication or data transfer connection that may facilitate the exchange of data between the inspection controller 80 and a controller (not shown) of the locomotive 12. The inspection controller 80 may store some or all of the data acquired by the inspection equipment in the memory 84 during the inspection process. The communication or data transfer connection may provide an efficient communication link for exchanging data between the inspection UAV 32 and the locomotive 12, for downloading software to the inspection controller 80 and performing other data exchange functions. While the controllers 50, 80, the communication modules 60, 90 and the power sources 62, 94 are illustrated and described herein, those skilled in the art will understand that the structure and functionality of each pair of components could be implemented in a single controller, communication module or power source, respectively, and such implementations are contemplated by the inventors.

Figure 6:
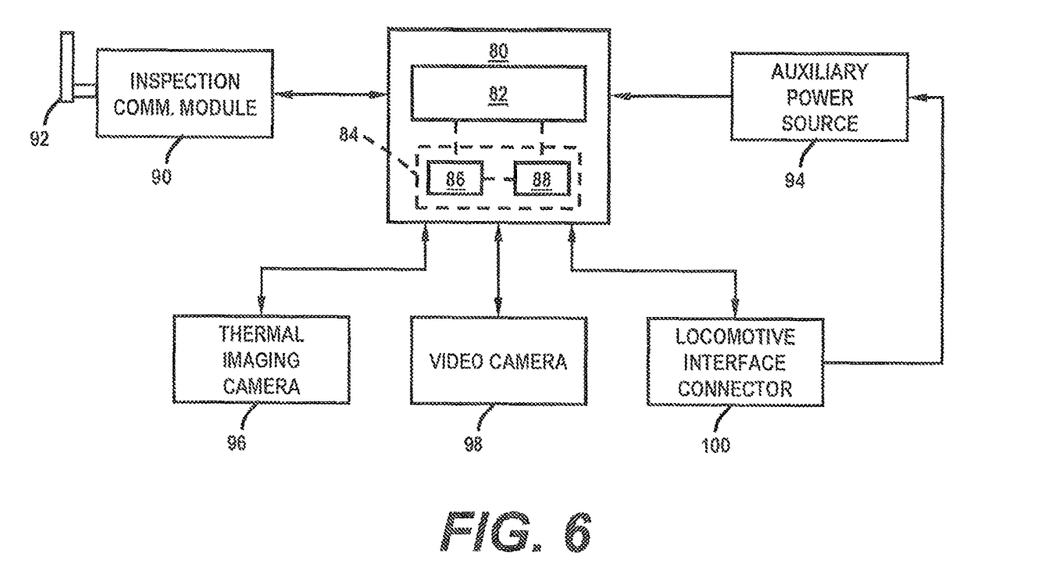
FIG. 6 is a block diagram of electrical and power elements of the locomotive of FIG. 1.

As mentioned above, the locomotive 12 has electrical components that are integrated into an inspection strategy to perform UAV flight and inspection control functions, communicate with the inspection UAV 32 and the back office, and process inspection data provided by the inspection equipment of the inspection UAV 32. FIG. 6 provides a block diagram of an embodiment of locomotive electrical and control components that may be implemented in the locomotive 12 for execution of inspection routines such as those described herein. Those skilled in the art will understand that some or all of the electrical and control components are implemented in presently known trains 10, the components may be provided with additional functionality for performance of the inspection routines. The inspection functions of the locomotive 12 may be controlled by a locomotive controller 110 that may be, for example, one of the types of control structures described above. Consequently, the locomotive controller 110 may include a processor 112 operatively connected to a memory 114 that includes a ROM 116 and a RAM 118. The memory 114 may store inspection control routines that will be used by the locomotive controller 110 to control the flight of the inspection UAV 32 and the performance of the inspection operations by the inspection UAV 32 when the inspection UAV 32 is deployed. The locomotive 12 may also have a locomotive communication module 120 for inspection-specific communications between the locomotive 12 and the inspection UAV 32 and/or the back office.

The locomotive 12 further includes a locomotive power source 122 for electrical power, such as a generator, an alternator, an electrical power storage device such as a battery or the like, that may provide electrical power to the locomotive electrical and control components, and to recharge the power sources 62, 94 of the inspection UAV 32. Power may be transferred from the locomotive power source 122 to the inspection UAV 32 via a UAV interface connector 124 that is complimentary to and engages with the locomotive interface connector 100 when the inspection UAV 32 is not in use and is docked at the locomotive 12. In addition to providing a power connection, the UAV interface connector 124 may include a communication or data transfer connection that may facilitate the exchange of data between the inspection controller 80 and the locomotive controller 110 in preparation for and/or after completion of the execution of the inspection routine by the inspection UAV 32. The communication or data transfer connection may provide an efficient communication link for exchanging data between the UAV controller 50 and the locomotive controller 110 for downloading inspection data from the inspection controller 80 and performing other data exchange functions.

The locomotive 12 may be equipped with additional inspection UAV flight control and navigation devices. For example, the inspection UAV 32 may include a GPS receiver 126 and an altimeter 128 that may be similar to the GPS receiver 64 and the altimeter 66 of the inspection UAV 32, respectively. The GPS receiver 126 and the altimeter 128 may provide a GPS location and an altitude for the locomotive 12 for use in positioning the inspection UAV 32 relative to the train 10 and returning the inspection UAV 32 to the locomotive 12 after the inspection is complete. The ability to perform inspection operations while the train 10 is moving may be dependent on the weather conditions through which the train 10 is travelling. Consequently, the locomotive 12 may also have sensors for detecting meteorological conditions, such as an anemometer 130 for measuring wind speed. Alternatively or in addition, the locomotive controller 110 may communicate with weather services via the locomotive communication module 120 to receive current weather condition information and weather forecasts for use in determining when the inspection UAV 32 may be safely deployed.

The locomotive 12 will further include interface devices allowing engineers or technicians to exchange information with the locomotive controller 110. The locomotive 12 may have a plurality of operator input devices 132 in the operator's cab 22 and at other locations for inputting commands for the locomotive controller 110 and other systems of the train 10. The operator input devices 132 are operatively connected to the locomotive controller 110 for one-way or two-way communications. Of particular relevance to the present disclosure are operator input devices 132 providing commands and data related to the operation of the inspection UAV 32 and the performance of inspection functions, such as inputs for initiating inspections or configuring inspection routines, and flight controllers such as joysticks that can allow an engineer or other operator to manually generate flight control signals for the inspection UAV 32. Operator output devices 134 may also be located in the operator's cab 22 and at other locations, and be operatively connected to the locomotive controller 110 to receive output command signals from the locomotive controller 110. The operator output devices 134 may be any devices capable of providing a sensory perceptible output to the operator, such as visual display devices, lamps, speakers, and the like. The information communicated to the engineer or technician may include operational data for the various systems of the train 10, schedule information, information communicated from the back office, and data transmitted by the inspection UAV 32 during and after performing inspections of the train 10.

Figure 7:
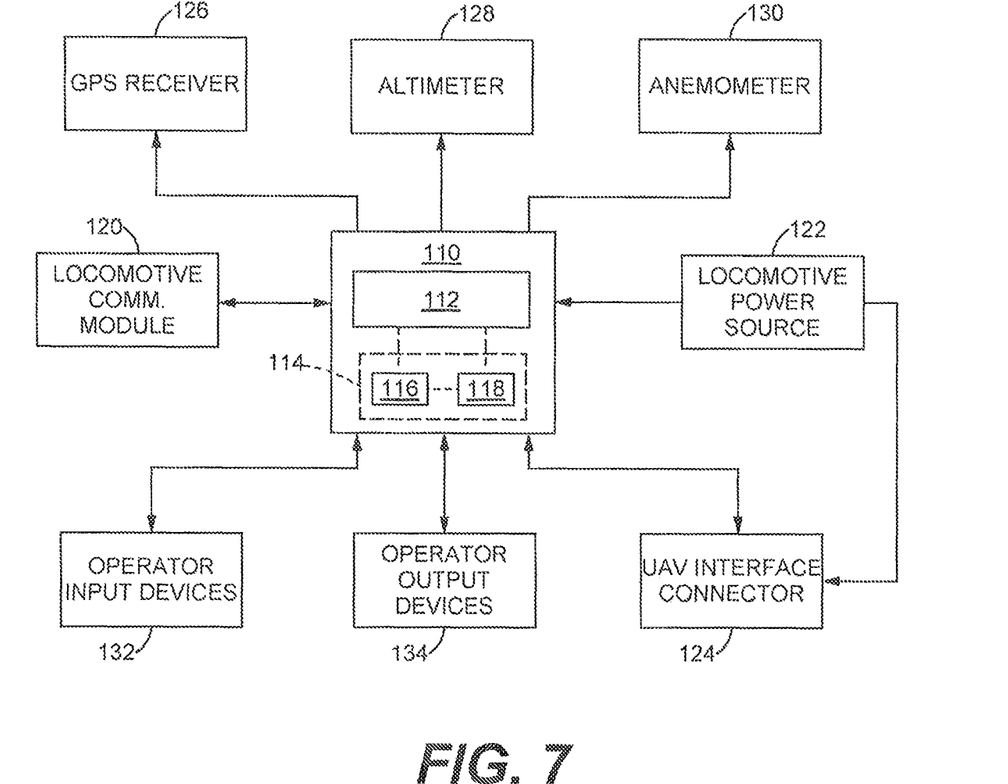
FIG. 7 is a side view of the inspection UAV of FIG. 3 docked in a docking station of the train of FIG. 1.

During normal operation of the train 10 travelling over the train tracks 26 and not being inspected, the inspection UAV 32 may be stored at the locomotive 12 or one of the rail cars 16. FIG. 7 illustrates the inspection UAV 32 docked at an exemplary docking station 140 implemented in the locomotive 12. The docking station 140 may be recessed at an appropriate location within the body 20 of the locomotive 12, and has a side wall 142 and a bottom wall 144. The docking station 140 may be located in an area where the docked inspection UAV 32 may be accessible from the operator's cab 22 or the walking platform 24 while the train 10 is moving.

In addition to being recessed, the docking station 140 may have a windshield or wind blocker 146 to shield the inspection UAV 32 from the wind, rain or other elements while docked. The windshield 146 may also provide an area of relatively calm air above the docking station 140 so the inspection UAV 32 can take off from and land in the docking station 140 in benign conditions. While the docking station 140 is illustrated and described as being recessed at the top of the locomotive 12, those skilled in the art will understand that the docking station 140 could be implemented in other appropriate locations on the train 10, such as within a side wall of the locomotive 12 to which the inspection UAV 32 enters laterally, or in one of the rail cars 16.

The docking station 140 also can provide interfaces between the inspection UAV 32 and the locomotive 12. The UAV interface connector 124 as described above may extend upwardly from the bottom wall 144 of the docking station 140. When the inspection UAV 32 is docking, the inspection UAV 32 may be positioned with the locomotive interface connector 100 aligned with the UAV interface connector 124 so that UAV interface connector 124 receives the locomotive interface connector 100 when the support structure 46 sets the inspection UAV 32 down on the bottom wall 144. As discussed above, the interface connectors 100, 124 may provide a direct communication link between the controllers 50, 80 and the locomotive controller 110, and a charging connection between the UAV power sources 62, 94 and the locomotive power source 122. In alternative embodiments, the direct communication link may be replaced with a high speed and/or high bandwidth wireless communication link with which the communication modules 90, 120 can communicate while the inspection UAV 32 is docked.

Figure 8:
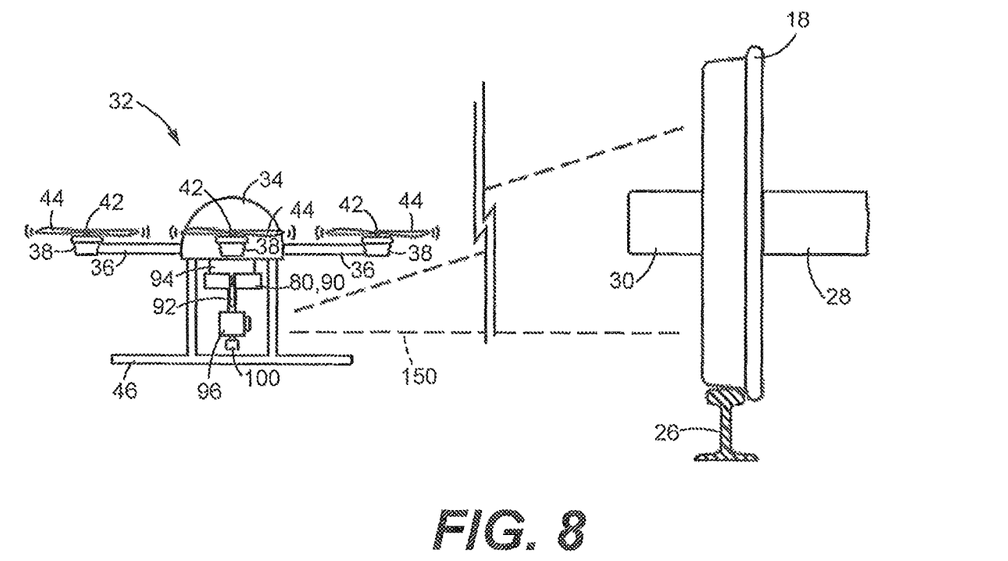
FIG. 8 is a side view of the inspection UAV of FIG. 3 positioned for inspection of the wheel and bearing of FIG. 2.

FIG. 8 illustrates the inspection UAV 32 deployed and in position to inspect one of the wheels 18 of the train 10 and the corresponding bearing 30. Based on information from the GPS receivers 64, 126, the altimeters 66, 128 and the distance sensor 68, for example, the flight control signals transmitted from the flight control logic executed by the locomotive controller 110 may position the inspection UAV 32 as shown. In one embodiment, flight control for the inspection UAV 32 may be completely automated and controlled by the controllers 50, 80, 110. The locomotive controller 110 may take the place of a manual flight controller and issue flight control signals that are transmitted to the inspection UAV 32 to cause the inspection UAV 32 to fly through a predetermined inspection path. The GPS location, altitude and distance from the inspected component sensed by the GPS receiver 64, the altimeter 66 and the distance sensor 68, respectively, may be transmitted from the inspection UAV 32 to the locomotive controller 110 for use as position feedback signals to adjust the flight of the inspection UAV 32 to the position shown in FIG. 8, for example. Further feedback may be provided by a distance sensor sensing a height of the inspection UAV 32 above the ground to ensure that the inspection UAV 32 does not fly into a hill or other undulation along the tracks 26. In alternate configurations, the GPS location and altitude of the train 10 sensed by the GPS receiver 126 and the altimeter 128, respectively, may be transmitted to the inspection UAV 32 along with the flight control signals and used by the UAV controller 50 to adjust the flight path of the inspection UAV 32 to reach or maintain the position of FIG. 8.

In alternative embodiments, or in a manual override of automated flight control, one of the operator input devices 132 may be a manual flight controller and the flight of the inspection UAV 32 may be controlled by an engineer or other operator on board the train 10, at the back office or at another location. In response to the flight control signals from the manual flight controller, the position information for the train 10 and the inspection UAV 32 from the GPS receivers 64, 126, the altimeters 66, 128 and the distance sensor 68 may be used in a similar manner as described above by the locomotive controller 110 or the UAV controller 50. In other manual implementations, the position information may be provided to the operator of the manual flight controller at the operator output devices 134 so the operator can determine whether adjustments to the flight of the inspection UAV 32 are required, and then make any necessary adjustments.

Whether the flight of the inspection UAV 32 in controlled automatically or manually, once the inspection UAV 32 is in the proper position such as that shown in FIG. 8, the inspection devices such as the thermal imaging camera 96 and the video camera 98 may direct their inspection signals 150 in the direction of the inspected components and perform the necessary inspection functions. The inspection UAV 32 may be placed in any position relative to the inspected components to provide a clear path for the inspection signals 150 to the inspected components. As shown in FIG. 8, the inspection UAV 32 may be disposed lower than may be expected in order to provide a clear path to the wheel 18 and the bearing 30 where other components such as a truck (not shown) connecting two adjacent wheels on the outboard side of the rail car 16 may cause an obstruction to positioning the inspection UAV 32 level with the wheel 18 and the bearing 30 and projecting the inspection signals 150 horizontally. In this case, the inspection signals 150 are projected upwardly toward an underside of the bearing 30. The view to the bearing 30 may be further improved if the inspection signals 150 are projected at the bearing 30 at an angle other than perpendicular to the tracks 26 and the direction of travel of the train 10. For example, the inspection UAV 32 may be positioned to view a rear portion of the bearing 30 by rotating the inspection UAV 32 approximately 45°, for example, about a vertical axis toward the direction of travel of the train 10 so that the inspection signals 150 are projected onto the rear portion of the bearing 30 as the train 10 travels past the inspection UAV 32. Alternative positioning of the inspection UAV 32 above or below or forward or rearward of the inspected components will be dictated by the particular configuration of the train 10, and flight control of the inspection UAV 32 for the appropriate vertical, horizontal and rotational positions is contemplated.

In lieu of or in addition to adjusting the position of the inspection UAV 32, the inspection equipment such as the thermal imaging camera 96 may be movable relative to the vehicle housing 34 into an unobstructed position. For example, the thermal imaging camera 96 may be mounted to the vehicle housing 34 by a telescopic or otherwise articulating arm (not shown), and the thermal imaging camera 96 may be mounted to the articulating arm by a gimbal or other similar connection device (not shown) that allows the thermal imaging camera 96 to pivot about and axis or axes relative to the articulating arm. Actuators of the articulating arm and gimbal may receive control signals from the inspection controller 80 to cause the components to move the thermal imaging camera 96 into position to perform the inspection without obstruction from other components.

INDUSTRIAL APPLICABILITY

Figure 9A:
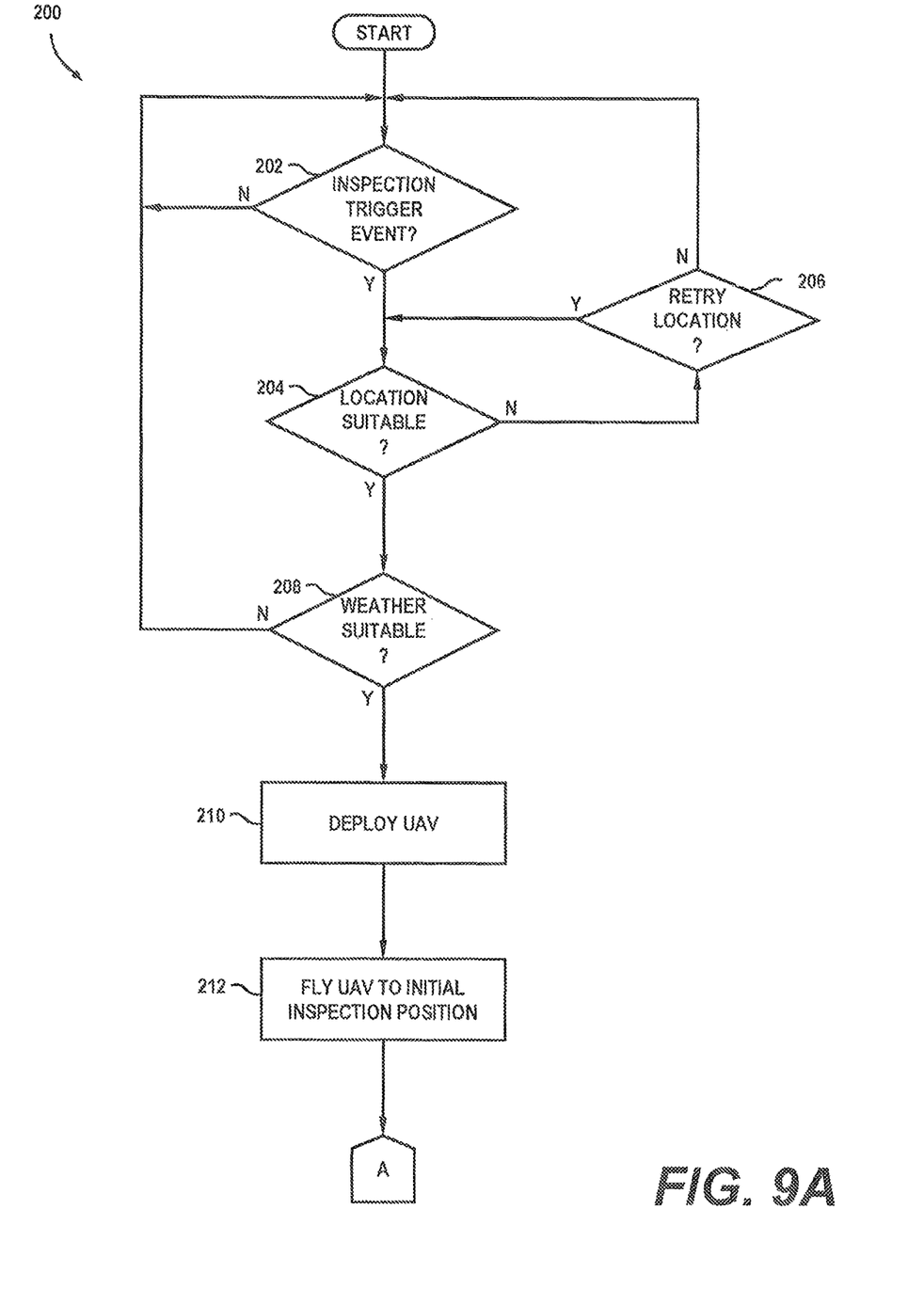
FIGS. 9A and 9B are a flow diagram of a train inspection routine in accordance with the present disclosure that may be implement with the train of FIG. 1 and the inspection UAV of FIG. 3.
Figure 9B:
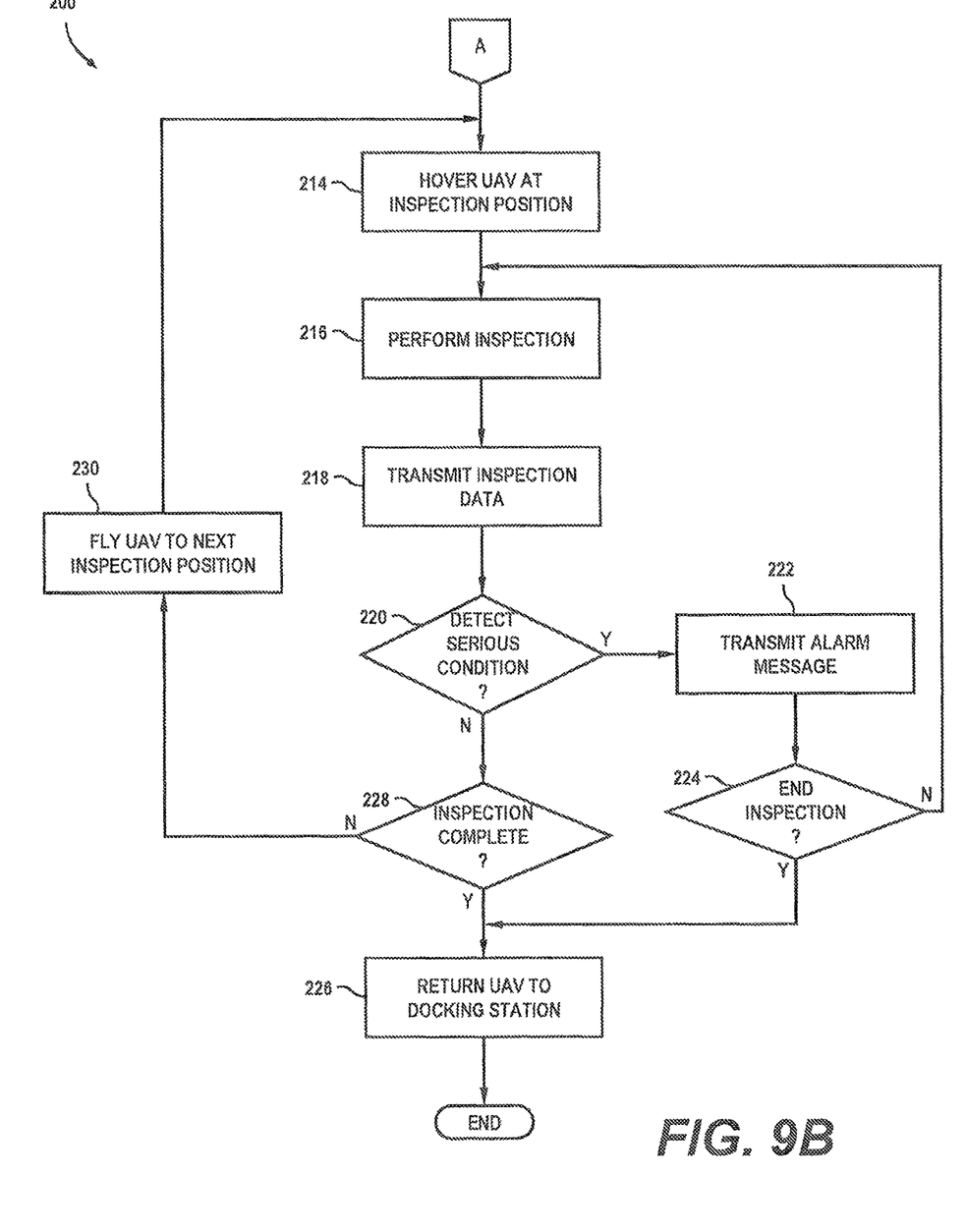

As discussed above, integration of the inspection UAV 32 with the train 10 facilitates inspection of the train 10 in route without the need for installing train inspection stations as permanent fixtures along the train tracks 26. FIGS. 9A and 9B illustrate one exemplary train inspection routine 200 that may be performed through the coordinated processing of the UAV controllers 50, 80 and the locomotive controller 110. A program or programs for executing the train inspection routine 200 may be distributed as necessary between the controllers 50, 80, 110 and stored in the corresponding memories 54, 84, 114 for execution by the processors 52, 82, 112. Those skilled in the art will understand that any particular distribution of processing for the execution of the train inspection routine 200 discussed herein is exemplary, and alternate distributions of processing or consolidations of processing at less than all of the controllers 50, 80, 110 are contemplated by the inventors as having use in performing inspections on moving trains 10 in accordance with the present disclosure.

The train inspection routine 200 may begin at a block 202 where the locomotive controller 110 may determine whether a triggering event for the inspection of the train 10 has occurred. In some implementations, the train inspection routine 200 may mirror the current inspection regimen and have inspections triggered when the train 10 is passing predetermined locations along the train line. A track map may be stored at the memory 114 and identify the predetermined inspection locations. The processor 112 may compare the GPS location from the GPS receiver 126 to the predetermined inspection locations of the track map and initiate an inspection when the train 10 reaches one of the inspection locations. In alternative implementations, other operating conditions may provide the triggering events for the train inspections. For example, an inspection may be triggered at a predetermined time of day, or after the train 10 travels continuously for a predetermined distance or for a predetermined period of time since the last inspection or since departing for its originating station. Inspections may also be initiated based on the occurrence of operating conditions that are known to be indicative or precursors of issues with the performance of the train 10, such as the train 10 travelling slower than a commanded train speed that may indicate excess friction or other forces causing a drag on the train 10. Further, as an alternative to or in addition to other triggering events, inspections may be triggered manually by an operator of the locomotive 12 via the operator input devices 132, or by an operator or technician at the back office that transmits an inspection initiation signal that is received at the locomotive communication module 120. Additional alternative inspection triggering events are contemplated by the inventors.

If an inspection triggering event is not detected or determined at the block 202, control may pass back to the block 202 to continue monitoring the operating conditions and other information for the occurrence of an inspection triggering event. If an inspection triggering event is detected or determined at the block 202, control may pass to a block 204 where the locomotive controller 110 determines whether the current location is suitable for performing the inspection. Because the inspection UAV 32 will be flying around the train 10, the flight path for the inspection UAV 32 must be free of obstructions and provide sufficient space to maneuver the inspection UAV 32. Consequently, the prospective inspection area may unsuitable if the train 10 is passing through a tunnel, under a bridge, through a narrow pass through mountains or forests, or in the vicinity of other obstructions that may interfere with the flight path. Some portions of the train line may have multiple tracks 26 running in parallel close together, and trains 10 on the other tracks 26 may obstruct the potential flight path of the inspection UAV 32.

Where the triggering event is the arrival at a predetermined inspection location, the area has likely been determined to be free of obstructions. For other triggering events that may occur at any location along the train line, the track map stored at the memory 114 may identify the various locations along the line that are either suitable or unsuitable for performing inspections with the inspection UAV 32. The locomotive controller 110 may compare the GPS location from the GPS receiver 126 to the track map to determine whether the train 10 is in a suitable or unsuitable location. If the inspection location is in an area of parallel tracks 26, the locomotive controller 110 may determine whether other trains 10 are on the parallel tracks 26 based on train schedules stored at the memory 114, or by communicating with the back office or other dispatcher systems to obtain information regarding the location of other trains 10 along the train line. Of course, the suitability of the location for inspection may be determined by other methods and criteria.

If the location at which the triggering event occurs is determined to be unsuitable for performing an inspection at the block 204, control may pass to a block 206 where the locomotive controller 110 determines whether the suitability of a location should be evaluated again after the train 10 has traveled farther along the train line. Under some circumstances, it may be preferable or required to perform the inspection at the first opportunity when the train 10 reaches a suitable inspection location on the train line. The inspection may be required when the operating conditions of the train 10 trigger the inspection. If the locomotive controller 110 determines that such circumstances exist, control may pass back to the block 204 to continue evaluating the suitability of the location of the train 10 until the train 10 reaches a suitable inspection location. If the locomotive controller 110 determines that the operating conditions or other triggering event do not require the inspection to be performed at the first opportunity at the block 206, control may pass back to the block 202 to wait for a subsequent triggering event to occur that will reinitiate the inspection process.

If the locomotive controller 110 determines that the location of the train 10 is suitable for performing the inspection at the block 204, control may pass to a block 208 where the locomotive controller 110 will determine whether the weather along the train line in the inspection area is suitable for performing the inspection. Various weather conditions may be unsuitable for flying the inspection UAV 32 around the train 10 in a manner that will provide a reliable inspection of the train 10 and without risk of crashing the inspection UAV 32. Such weather conditions may include high winds and excessive precipitation. The locomotive controller 110 may evaluate the information from the anemometer 130 and other meteorological condition sensors implemented on the train 10, and information received from weather services and stored in the memory 114. If the locomotive controller 110 determines that harsh weather conditions exist that preclude performing the inspection, control may pass back to the block 202 to wait for a subsequent triggering event to occur. In alternative embodiments, the locomotive controller 110 may perform logic similar to block 206 as discussed above to continuously reevaluate the weather until it is suitable for the inspection instead of waiting for the occurrence of a subsequent triggering event.

If the locomotive controller 110 determines that the weather through which the train 10 is traveling is suitable for performing the inspection at the block 208, the inspection may begin and control may pass to a block 210 where the locomotive controller 110 generates flight control signals and transmits the signals to the inspection UAV 32 to cause the inspection UAV 32 to deploy from the docking station 140. Upon receiving the flight control signals, the UAV controller 50 operatively connects the UAV power source 62 to the propeller drive motors 40. The propellers 44 begin to spin and create lift and elevate the inspection UAV 32 from the docking station 140. The deployment sequence of flight control signals may cause the inspection UAV 32 to travel through a path out of the docking station 140 and past the windshield 146 that will not subject the inspection UAV 32 to a blast of wind or turbulence caused by the movement of the train 10 that is sufficient to alter or impede the flight of the inspection UAV 32.

After the inspection UAV 32 is deployed from docking station 140, which may be indicated by the UAV position and altitude from the GPS receiver 64 and the altimeter 66, respectively, control may pass to a block 212 where the locomotive controller 110 generates flight control signals and transmits the signals to the inspection UAV 32 to cause the inspection UAV 32 to fly to an initial inspection position relative to the train 10 at which the inspection functions will begin. Under one inspection strategy, the inspection UAV 32 may inspect the components such as wheels 18 and bearings 30 on one side of the train 10, and then reposition to inspect the components on the opposite side of the train 10. In this strategy, the inspection UAV 32 is initially positioned at the front of the locomotive 12 on the first side that will be inspected. The locomotive controller 110 may use the position and altitude information from the GPS receivers 64, 126 and the altimeters 66, 128 to generate and transmit flight control signals that will cause the inspection UAV 32 to fly to the initial position at the front of the locomotive 12. The altitudes and the distance information from the distance sensor 68 are also used to adjust the flight control signals so that the inspection UAV 32 is positioned as shown in FIG. 8 during the inspection.

With the inspection UAV 32 disposed at the initial inspection position, control may pass to a block 214 where the locomotive controller 110 adjusts the flight control signals to cause the inspection UAV 32 to hover in position. In this strategy, the inspection UAV 32 will remain in approximately a fixed position and inspect the train components as the train 10 travels along the train tracks 26 past the inspection UAV 32. When the inspection UAV 32 is hovering in position, control may pass to a block 216 where the locomotive controller 110 transmits inspection control signals to the inspection controller 80 to cause the inspection equipment to perform the inspection operations on the components as the train 10 continues traveling over the train tracks 26. Inspection of the wheels 18 and the bearings 30 is illustrated herein, but other components of the train 10 may be inspected by the inspection UAV 32.

In some inspection strategies, the inspection data acquired by the inspection equipment may be stored in the memory 84 during the inspection and downloaded to the locomotive controller 110 and/or transmitted to the back office when the inspection UAV 32 returns to the docking station 140. In other strategies, it is desired or necessary to transmit some or all of the inspection data to the locomotive controller 110 or back office in real time. For example, the memory 84 on board the inspection UAV 32 may have insufficient capacity to store all the inspection data acquired during the inspection. Moreover, it may be desirable to transmit the inspection data in real time for analysis of the inspection data by the locomotive controller 110 or back office, or for display to and analysis by an operator or technician at the locomotive 12 or back office. In real time download strategies, control may pass to a block 218 for transmission of some or all of the inspection data to the locomotive controller 110 and/or the back office while the inspection is being performed at the block 216.

The inspection controller 80 may be configured to analyze a portion or all of the inspection data on board the inspection UAV 32 as the inspection is performed. The analysis may be able to identify serious conditions in the inspected components, such as a wheel 18 or a bearing 30 having a temperature that is greater than a predetermined maximum safe operating temperature. In implementations where on-board analysis is performed, control may pass to a block 220 where the inspection controller 80 determines whether a serious condition in the inspected components is detected from the inspection data. If a serious condition is detected by the inspection controller 80 at the block 220, control may pass to a block 222 where the inspection controller 80 may transmit an alarm message to the locomotive controller 110 and/or the back office indicating the detected serious condition.

When the alarm message is received at the locomotive controller 110 and/or the back office, the alarm message is evaluated to determine whether any actions are required in response to the serious condition. For some conditions, it may be sufficient to store the message in an alarm log in the memory 114 for follow up inspections by maintenance personnel at a later time when the train 10 is stopped. If the condition is more serious, the locomotive controller 110 may cause operator output devices 134 to output a visual and/or audible representation of the alarm message for an operator or technician. Some conditions may indicate the occurrence or imminent occurrence of a failure of the component that may necessitate stopping the train, and the locomotive controller 110 may notify the operator or technician to stop the train 10, or may be configured to automatically stop the train 10.

Since conditions may be serious enough to stop the train 10, it may not be necessary to complete the inspection process. Consequently, control may pass from the block 222 to a block 224 where one of the controllers 80, 110 may determine whether the inspection should end. If the controller 80, 110 performing the evaluation determines that the inspection should end based on the serious condition and the response to the condition, control may pass to a block 226 where the locomotive controller 110 generates flight control signals and transmits the signals to the inspection UAV 32 to cause the inspection UAV 32 to return to the docking station 140. The locomotive controller 110 may be programmed with a docking sequence of flight control signals that may cause the inspection UAV 32 to travel through a path to and into of the docking station 140 and behind the windshield 146 that will not subject the inspection UAV 32 to a blast of wind or turbulence caused by the movement of the train 10 that is sufficient to alter or impede the flight of the inspection UAV 32. The homing signals from the homing signal generator 70 and transmitted by the inspection UAV 32 may be used by the locomotive controller 110 as a more precise indication of the position of the inspection UAV 32 than the GPS position for guiding the inspection UAV 32 into the docking station 140. In alternative embodiments, a homing signal or other location indicator for the docking station 140 may be transmitted to and received by the inspection UAV 32 and used by return guidance software stored at the memory 54 to guide the inspection UAV 32 into the docking station 140. If the controller 80, 110 determines that the inspection should continue despite the serious condition and the response to the condition at the block 224, control may pass back to the block 216 to continue the performance of the inspection of the train components.

If a serious condition is not detected by the inspection controller 80 at the block 220 and the initial portion of the inspection has been performed at the blocks 214-220, control may pass to a block 228 where the inspection controller 80 or the locomotive controller 110 may determine whether the inspection is complete. If controller 80, 110 determines that the inspection is not complete, control may pass to a block 230 where the locomotive controller 110 may generate and transmit flight control signals that will cause the inspection UAV 32 to fly to the next inspection position. In the example above, the flight control signals may cause the inspection UAV 32 to fly to the front of the locomotive 12 on the second side of the train 10 to place the inspection UAV 32 in position to inspect the components of the second side of the train 10 in a similar manner as discussed for the block 212 for the first side of the train 10. When the inspection UAV 32 is in position for the next portion of the inspection routine, control may pass back to the block 214 to cause the inspection UAV 32 to hover in position and to the block 216 to perform the inspection of the second side of the train 10. If controller 80, 110 determines that the inspection is complete at the block 228, control may pass to the block 226 to cause the inspection UAV 32 to return to the docking station 140 and to end the train inspection routine 200.

Those skilled in the art will understand that the train inspection routine 200 is exemplary, and may be modified as necessary to perform the necessary inspection functions on the components of the train 10. For example, the speed of the train and the resolution of the inspection equipment may require the inspection UAV 32 move with the train 10 instead of hovering as the train 10 passes on the train line where the train 10 is traveling too fast for the inspection equipment to capture the required inspection data. In this situation, the flight control signals from the locomotive controller 110 may cause the inspection UAV 32 to fly in the direction the train 10 is travelling at a speed that will result in a relative speed between the train 10 and the inspection UAV 32 that allows the inspection equipment to capture the necessary inspection data. In extreme cases, the inspection UAV 32 may fly at the same speed that the train 10 is travelling and remain stationary with respect to an inspected component until sufficient inspection data is collected. Once the inspection data is collected, the inspection UAV 32 may be repositioned proximate the next inspected component.

In other embodiments, each train 10 may be provided with multiple inspection UAVs 32. The docking station 140 may be configured to accommodate multiple inspection UAVs 32, or the train 10 may be configured with multiple docking stations 140, and possibly one docking station 140 for each inspection UAV 32. The train inspection routine 200 may be configured to use one inspection UAV 32 as a primary inspector and the additional inspection UAV(s) 32 as secondary or backup inspectors that may be deployed if the primary inspection UAV 32 is damaged, requires charging or is otherwise unavailable to perform the inspection. Alternatively, the additional inspection UAVs 32 may be integrated into the train inspection routine 200 so that multiple inspection UAVs 32 operate simultaneously to perform the inspection. For example, in the embodiment described above, a second inspection UAV 32 may inspect the second side of the train 10 at the same time the first inspection UAV 32 is inspecting the first side of the train 10. Additional modifications to the train inspection routine 200 are contemplated.

Current monitoring systems including train inspection stations located along the train line represent a significant infrastructure cost for the railroads. Additionally, maintenance crews must travel to the train inspection stations for inspection and servicing of the stations. It may not be practical to have maintenance crews located in close proximity to the stations, so unproductive time and expense may be spent just in getting the crews to the stations. Further, depending on the geography of the territory through which the train line runs, some stations may be relatively inaccessible, thereby make travel to the stations additionally burdensome.

Train inspections in accordance with the present disclosure using inspection UAVs 32 associated with the trains may provide a cost effective alternative to fixed train inspection stations. Configuring an inspection UAV 32 with the inspection equipment is significantly less expensive than building the permanent inspection station at 15-25 mile intervals along the train line. Moreover, the inspection UAVs 32 can be delivered to the maintenance personnel and their equipment instead of transporting the personnel and equipment to the inspection stations. The inspection UAVs 32 also provide greater flexibility in the timing of performing inspections than is offered by the train inspection stations. The inspection UAVs 32 may be deployed to inspect the train 10 at any suitable location along the train line. Additionally, the inspections may be initiated upon the occurrence of any relevant trigger event, and are not limited to only being performed at specific predetermined locations along the train line where the inspection stations are installed. Ultimately, train inspection routines in accordance with the present disclosure may provide more timely detection and correction of operational issues, resulting in less time that the trains 10 are out of service and not generating revenue for the railroad.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method for inspecting external components of a moving train having, a locomotive and a plurality of rail cars, the method comprising:
    deploying an inspection unmanned aerial vehicle (UAV) from one of the locomotive and one of the plurality of rail cars to the exterior of the moving train while the moving train, is moving along a train line on train tracks;
    flying the inspection UAV to an initial inspection position adjacent to the moving train;
    performing an inspection function on the external components of the moving train via inspection equipment mounted on the inspection UAV and starting at the initial inspection position;
    comprising causing the inspection UAV to hover at the initial inspection position adjacent to the moving train, wherein performing the inspection function on the external components occurs while the inspection UAV is hovering at the initial inspection position and the moving train moves past the inspection UAV at the initial inspection position;
    determining a temperature of wheels and bearings of the moving train using an infrared (IR) thermal imaging camera while the UAV is external to the train and the train is moving;
    returning the inspection UAV to the one of the locomotive and the one of the plurality of rail cars after performance of the inspection function on the external components of the moving train is complete.

2. The method of claim 1, wherein deploying the inspection UAV occurs in response to detecting an occurrence of an inspection triggering event.

3. The method of claim 1, comprising transmitting inspection data from the inspection UAV to a locomotive controller in real-time while the inspection UAV is performing the inspection function on the components.

4. The method of claim 1, comprising:
    determining that the performance of the inspection function starting at the initial inspection position adjacent to the moving train in complete;
    flying the inspection UAV to a second inspection position relative adjacent to the moving train; and
    performing the inspection function on the external components of the moving train via the inspection equipment mounted on the inspection UAV and starting at the second inspection position.

5. The method of claim 1, comprising:
    determining at the inspection UAV during the performance of the inspection function that a serious condition exists at an inspected external component of the moving train; and
    transmitting an alarm message from the inspection UAV to a locomotive controller in response to determining that the serious condition exists at the inspected external component.

6. The method of claim 5, comprising returning the inspection UAV to the one of the locomotive and the one of the plurality of rail cars in response to determining that the serious condition exists at the inspected external component.

7. The method of claim 1, wherein performing the inspection function on the external components of the moving train comprises determining a temperature of the external components of the moving train using an infrared (IR) thermal imaging camera.

* * * * *